United States Patent
Zhou et al.

(10) Patent No.: US 11,416,792 B2
(45) Date of Patent: Aug. 16, 2022

(54) NETWORK SYSTEM CAPABLE OF GROUPING MULTIPLE SERVICE REQUESTS

(71) Applicant: Uber Technologies, Inc., San Francisco, CA (US)

(72) Inventors: Jiang Zhou, San Francisco, CA (US); Jyothidhar Pulakunta, Dublin, CA (US); Xiaoting Yin, San Francisco, CA (US); Yuanchi Ning, San Francisco, CA (US); Aditya Tayade, San Mateo, CA (US); Andrew Timothy Szybalski, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 277 days.

(21) Appl. No.: 15/491,932

(22) Filed: Apr. 19, 2017

(65) Prior Publication Data
US 2018/0308038 A1    Oct. 25, 2018

(51) Int. Cl.
*G06Q 10/06* (2012.01)

(52) U.S. Cl.
CPC ........... *G06Q 10/063118* (2013.01); *G06Q 10/063114* (2013.01)

(58) Field of Classification Search
CPC ........... G06Q 10/163118; G06Q 10/063114
See application file for complete search history.

(56) References Cited

U.S. PATENT DOCUMENTS

| | | | |
|---|---|---|---|
| 6,006,159 | A | 12/1999 | Schmier |
| 6,226,570 | B1 | 5/2001 | Hahn |
| 6,553,379 | B1 | 4/2003 | Jaeger |
| 6,756,913 | B1 | 6/2004 | Ayed |
| 6,862,572 | B1 | 3/2005 | de Sylva |
| 7,064,681 | B2 | 6/2006 | Horstemeyer |
| 8,315,802 | B2 | 11/2012 | Brown |
| 8,781,501 | B2 | 7/2014 | Kawazoe |
| 8,860,587 | B2 | 10/2014 | Nordstrom |
| 9,684,627 | B1 | 6/2017 | Sar |
| 9,754,331 | B1 | 9/2017 | Beckelman |
| 9,993,735 | B2 | 6/2018 | Aghdaie |

(Continued)

FOREIGN PATENT DOCUMENTS

| | | |
|---|---|---|
| CN | 104751272 | 7/2015 |
| KR | 10-2014-0016053 | 2/2014 |

(Continued)

OTHER PUBLICATIONS

ISR and Written Opinion in PCT/US2018/058554 dated Feb. 13, 2019.

(Continued)

*Primary Examiner* — Nadja N Chong Cruz
(74) *Attorney, Agent, or Firm* — Dority & Manning, P.A.

(57) ABSTRACT

A network system managing a network service can receive queries and service requests from multiple user devices. The network system can manage the network service such that multiple service requests can be fulfilled by a single service provider. In addition, the network system can dynamically compute parameters associated with the network service. The computation of the parameters can be based on pending service requests or anticipated demand for the network service.

18 Claims, 7 Drawing Sheets

(56) References Cited

U.S. PATENT DOCUMENTS

| | | |
|---|---|---|
| 10,026,055 B2 | 7/2018 | Riel-Dalpe |
| 10,029,787 B1 | 7/2018 | Lesser |
| 10,036,641 B1 | 7/2018 | Iland |
| 10,133,995 B1 | 11/2018 | Reiss |
| 10,152,743 B1* | 12/2018 | Nguyen ............. G06Q 30/0635 |
| 10,156,449 B2 | 12/2018 | Colijin |
| 10,176,448 B1* | 1/2019 | Rhodes ................. G01S 19/14 |
| 10,308,430 B1 | 6/2019 | Brady |
| 10,360,616 B2 | 7/2019 | Lopez |
| 10,366,434 B1 | 7/2019 | Belousova |
| 10,445,672 B2 | 10/2019 | Renfroe |
| 10,467,562 B1 | 11/2019 | Mo |
| 10,467,563 B1 | 11/2019 | Mo |
| 10,586,273 B1 | 3/2020 | Kohli |
| 11,023,990 B2 | 6/2021 | Choski |
| 2001/0047285 A1 | 11/2001 | Borders |
| 2002/0152128 A1 | 10/2002 | Walch |
| 2002/0188492 A1 | 12/2002 | Borton |
| 2004/0030572 A1 | 2/2004 | Campbell |
| 2004/0181454 A1 | 9/2004 | Manno |
| 2004/0210621 A1 | 10/2004 | Antonellis |
| 2004/0260470 A1 | 12/2004 | Rast |
| 2005/0209913 A1 | 9/2005 | Wied |
| 2007/0033087 A1 | 2/2007 | Combs |
| 2008/0046326 A1 | 2/2008 | Horstemeyer |
| 2008/0195428 A1 | 8/2008 | O'Sullivan |
| 2009/0048890 A1 | 2/2009 | Burgh |
| 2010/0153279 A1 | 6/2010 | Zahn |
| 2011/0258134 A1 | 10/2011 | Mendez |
| 2011/0307282 A1 | 12/2011 | Camp |
| 2012/0191551 A1* | 7/2012 | Lutnick ................. G06Q 20/20 705/15 |
| 2012/0203619 A1 | 8/2012 | Lutnick |
| 2012/0253878 A1 | 10/2012 | Forstall |
| 2012/0296770 A1 | 11/2012 | Lin |
| 2012/0323642 A1 | 12/2012 | Camp |
| 2013/0073327 A1 | 3/2013 | Edelberg |
| 2013/0218727 A1 | 8/2013 | Lutnick |
| 2013/0246207 A1* | 9/2013 | Novak ............... G06Q 30/0283 705/26.2 |
| 2014/0011522 A1 | 1/2014 | Lin |
| 2014/0026054 A1 | 1/2014 | Wang |
| 2014/0058902 A1 | 2/2014 | Taylor |
| 2014/0108201 A1 | 4/2014 | Franchette |
| 2014/0122301 A1 | 5/2014 | Tamassia |
| 2014/0129302 A1 | 5/2014 | Amin |
| 2014/0156359 A1 | 6/2014 | Morgan |
| 2014/0164126 A1 | 6/2014 | Nicholas |
| 2014/0172739 A1 | 6/2014 | Anderson |
| 2014/0188750 A1 | 7/2014 | Seiler |
| 2014/0214465 A1 | 7/2014 | L'Heureaux |
| 2014/0229099 A1 | 8/2014 | Garrett |
| 2014/0278635 A1 | 9/2014 | Fulton |
| 2014/0351164 A1 | 11/2014 | Ballenger |
| 2014/0370167 A1 | 12/2014 | Garden |
| 2015/0142640 A1 | 5/2015 | Kneen |
| 2015/0154538 A1 | 6/2015 | Skaaksrud |
| 2015/0204684 A1 | 7/2015 | Rostamian |
| 2015/0223024 A1 | 8/2015 | Abuodeh |
| 2015/0227980 A1 | 8/2015 | Eberhardt |
| 2015/0242810 A1 | 8/2015 | Rifai |
| 2015/0248689 A1 | 9/2015 | Paul |
| 2015/0262121 A1 | 9/2015 | Riel-Dalpe |
| 2015/0301150 A1 | 10/2015 | Stuckman |
| 2015/0310379 A1 | 10/2015 | Farrelly |
| 2015/0323332 A1 | 11/2015 | Lord |
| 2015/0323333 A1 | 11/2015 | Lord |
| 2015/0323334 A1 | 11/2015 | Lord |
| 2015/0324734 A1 | 11/2015 | Lord |
| 2015/0324735 A1 | 11/2015 | Lord |
| 2015/0324944 A1 | 11/2015 | Lord |
| 2015/0347964 A1 | 12/2015 | Taylor |
| 2015/0363843 A1 | 12/2015 | Loppatto |
| 2016/0012391 A1 | 1/2016 | Burnett |
| 2016/0012394 A1 | 1/2016 | Reed |
| 2016/0019496 A1 | 1/2016 | Gorlin |
| 2016/0027079 A1 | 1/2016 | Schoeffler |
| 2016/0034845 A1 | 2/2016 | Hiyama |
| 2016/0035248 A1 | 2/2016 | Gibbs |
| 2016/0042303 A1 | 2/2016 | Medina |
| 2016/0078516 A1 | 3/2016 | Alnuwaysir |
| 2016/0092972 A1 | 3/2016 | Blatstein |
| 2016/0104112 A1 | 4/2016 | Gorlin |
| 2016/0104113 A1 | 4/2016 | Gorlin |
| 2016/0132792 A1 | 5/2016 | Rosnow |
| 2016/0140569 A1 | 5/2016 | Deshpande |
| 2016/0140589 A1 | 5/2016 | Deshpande |
| 2016/0148306 A1 | 5/2016 | Bellavance |
| 2016/0171439 A1 | 6/2016 | Ladden |
| 2016/0171542 A1 | 6/2016 | Fanous |
| 2016/0171584 A1 | 6/2016 | Cao |
| 2016/0210591 A1 | 7/2016 | Lafrance |
| 2016/0307289 A1 | 10/2016 | Choski |
| 2016/0328669 A1 | 11/2016 | Droege |
| 2016/0353235 A1 | 12/2016 | Williams |
| 2017/0024789 A1 | 1/2017 | Frehn |
| 2017/0083862 A1 | 3/2017 | Loubriel |
| 2017/0093803 A1 | 3/2017 | Nayshtut |
| 2017/0116566 A1 | 4/2017 | Walton |
| 2017/0169385 A1 | 6/2017 | High |
| 2017/0178057 A1 | 6/2017 | Al Rifai |
| 2017/0270794 A1 | 9/2017 | Sweeney |
| 2017/0290345 A1 | 10/2017 | Garden |
| 2017/0337511 A1 | 11/2017 | Shroff |
| 2018/0025298 A1 | 1/2018 | Baggott |
| 2018/0067620 A1 | 3/2018 | Adler |
| 2018/0089621 A1 | 3/2018 | Perez Barrara |
| 2018/0157993 A1 | 6/2018 | Northrup |
| 2018/0188068 A1 | 7/2018 | Droege |
| 2018/0189729 A1 | 7/2018 | Droege |
| 2018/0202818 A1 | 7/2018 | Zhang |
| 2018/0225796 A1 | 8/2018 | Liu |
| 2018/0231984 A1 | 8/2018 | Alonso-Mora |
| 2018/0253805 A1 | 9/2018 | Kelly |
| 2018/0300660 A1 | 10/2018 | Coan |
| 2018/0336510 A1 | 11/2018 | DaCosta |
| 2019/0026662 A1 | 1/2019 | Kring |
| 2019/0035037 A1 | 1/2019 | Chase |
| 2019/0064801 A1 | 2/2019 | Frazzoli |
| 2019/0113361 A1 | 4/2019 | Droege |
| 2019/0114583 A1 | 4/2019 | Ripert |
| 2019/0130260 A1 | 5/2019 | Han |
| 2019/0130320 A1 | 5/2019 | Friend |
| 2019/0130350 A1 | 5/2019 | Nguyen |
| 2019/0130354 A1 | 5/2019 | Han |
| 2019/0132699 A1 | 5/2019 | Nikulkov |
| 2019/0132702 A1 | 5/2019 | Ehsani |
| 2019/0163710 A1 | 5/2019 | Haghighat Kashani |
| 2019/0289427 A1 | 9/2019 | Lin |
| 2019/0295440 A1 | 9/2019 | Hadad |
| 2020/0033156 A1 | 1/2020 | Droege |
| 2020/0065734 A1 | 2/2020 | Szybalski |
| 2020/0074524 A1 | 3/2020 | Smith |
| 2020/0090248 A1 | 3/2020 | Zeng |
| 2020/0151660 A1 | 5/2020 | Warr |
| 2020/0160264 A1 | 5/2020 | Silverman |
| 2020/0265366 A1 | 8/2020 | Mo |
| 2020/0311618 A1 | 10/2020 | Eichler |
| 2020/0333161 A1 | 10/2020 | Droege |
| 2020/0374650 A1 | 11/2020 | Jung |
| 2021/0081880 A1 | 3/2021 | Bivins |
| 2021/0224944 A1 | 7/2021 | Choski |

FOREIGN PATENT DOCUMENTS

| | | |
|---|---|---|
| KR | 10-2014-0101501 | 8/2014 |
| KR | 10-20170054739 | 5/2017 |
| WO | WO 2001052163 | 7/2001 |
| WO | 2014/030976 | 2/2014 |

(56) References Cited

FOREIGN PATENT DOCUMENTS

| WO | WO 2017/148202 | 9/2017 |
|---|---|---|
| WO | WO 2018/209263 | 11/2018 |

OTHER PUBLICATIONS

ISR and Written Opinion in PCT/US2018/058859 dated Feb. 20, 2019.
Reutt, Alex "Deliveroo Frank About Improved Algorithm Improving Service Times by 31%", Oct. 17, 2017 (https://www.itwire.com/home-it/80398-deliveroo-frank-about-improved-algorithm-improving-service-times-by-31.html).
ISR and Written Opinion in PCT/US2019/051993 dated Sep. 19, 2019.
HungryBBQ Delivery Details, Sep. 11, 2019 www.hungrybbq.com/delivery_info.php.
Eatzcatering FAQ, Nov. 13, 2018 www.eatzcatering.com.
Written Opinion in PCT/US2018/058859 dated Oct. 21, 2019.
IPRP dated Nov. 7, 2019 in PCT/US2018/058554.
Technological Disruption and Innovation in Last-Mile Delivery, Stanford Value Chain Innovation Initiative, Stanford, Jun. 2016.
Collaborative Urban Logistics: Synchronized Last-Mile Logistics for Sustainable, Efficient Urban Delivery, TLI Asia Pacific White Paper Series, vol. 13, Nov. 2013.
Grand Junction Local Delivery Reinvented—Last Mile Platform Help, Grand Junction Inc., PerfectLastMile.com, 2016.
Computerised Vehicle Routing and Scheduling (CVRS) for Efficient Logistics, Department for Transport, 2005.
IPRP dated Aug. 25, 2020 in PCT/US2019/051993.
Mabe, John, The 'Uber-for-X Model' and the Complexity of On-Demand Delivery, Techgistics, Dec. 1, 2016.
Singliar, Tomas, Demand Forecasting for Shipping and Distribution, Azure AI Gallery, Jun. 26, 2017.
Chen, P., Crowdsourced Delivery for Last-Mile Distribution: An Agent-Based Modeling and Simulation Approach, IEEE, 2017.
U.S. Appl. No. 16/111,013, Office Action dated Jul. 9, 2021, 25 pages.
PCT International Preliminary Report on Patentability in Application PCT/US2016/027869, dated Oct. 26, 2017, 9 pages.
PCT International Preliminary Report on Patentability in PCT/US2018/058859, dated Jan. 20, 2020, 20 pages.
PCT International Search Report and Written Opinion issued in PCT/US2016/027869 dated Jul. 20, 2016, 10 pages.
U.S. Appl. No. 15/130,018, Advisory Action dated Aug. 18, 2020, 3 pages.
U.S. Appl. No. 15/130,018, Notice of Allowance dated Jan. 27, 2021, 9 pages.
U.S. Appl. No. 15/130,018, Office Action dated Jan. 24, 2020, 28 pages.
U.S. Appl. No. 15/130,018, Office Action dated May 4, 2020, 33 pages.
U.S. Appl. No. 15/802,385, Office Action dated Jan. 7, 2020, 33 pages.
U.S. Appl. No. 15/802,385, Office Action dated Jul. 30, 2020, 39 pages.
U.S. Appl. No. 15/802,391, Office Action dated Dec. 12, 2019, 30 pages.
U.S. Appl. No. 15/802,391, Office Action dated Mar. 26, 2020, 35 pages.
U.S. Appl. No. 15/802,394, Office Action dated Nov. 22, 2019, 26 pages.
U.S. Appl. No. 15/802,394, Office Action dated Mar. 30, 2020, 27 pages.
U.S. Appl. No. 15/802,395, Office Action dated Feb. 2, 2021, 25 pages.
U.S. Appl. No. 15/802,395, Office Action dated Jun. 26, 2020, 22 pages.
U.S. Appl. No. 16/192,342, Office Action dated Jun. 11, 2021, 23 pages.
U.S. Appl. No. 16/365,553, Office Action dated Nov. 18, 2020, 34 pages.
U.S. Appl. No. 16/365,553, Office Action dated Apr. 12, 2021, 32 pages.
U.S. Appl. No. 16/365,553, Office Action dated Jul. 26, 2021, 34 pages.
U.S. Appl. No. 16/111,013, Office Action dated Jul. 2, 2020, 33 pages.
U.S. Appl. No. 16/111,013, Office Action dated Mar. 4, 2021, 24 pages.

\* cited by examiner

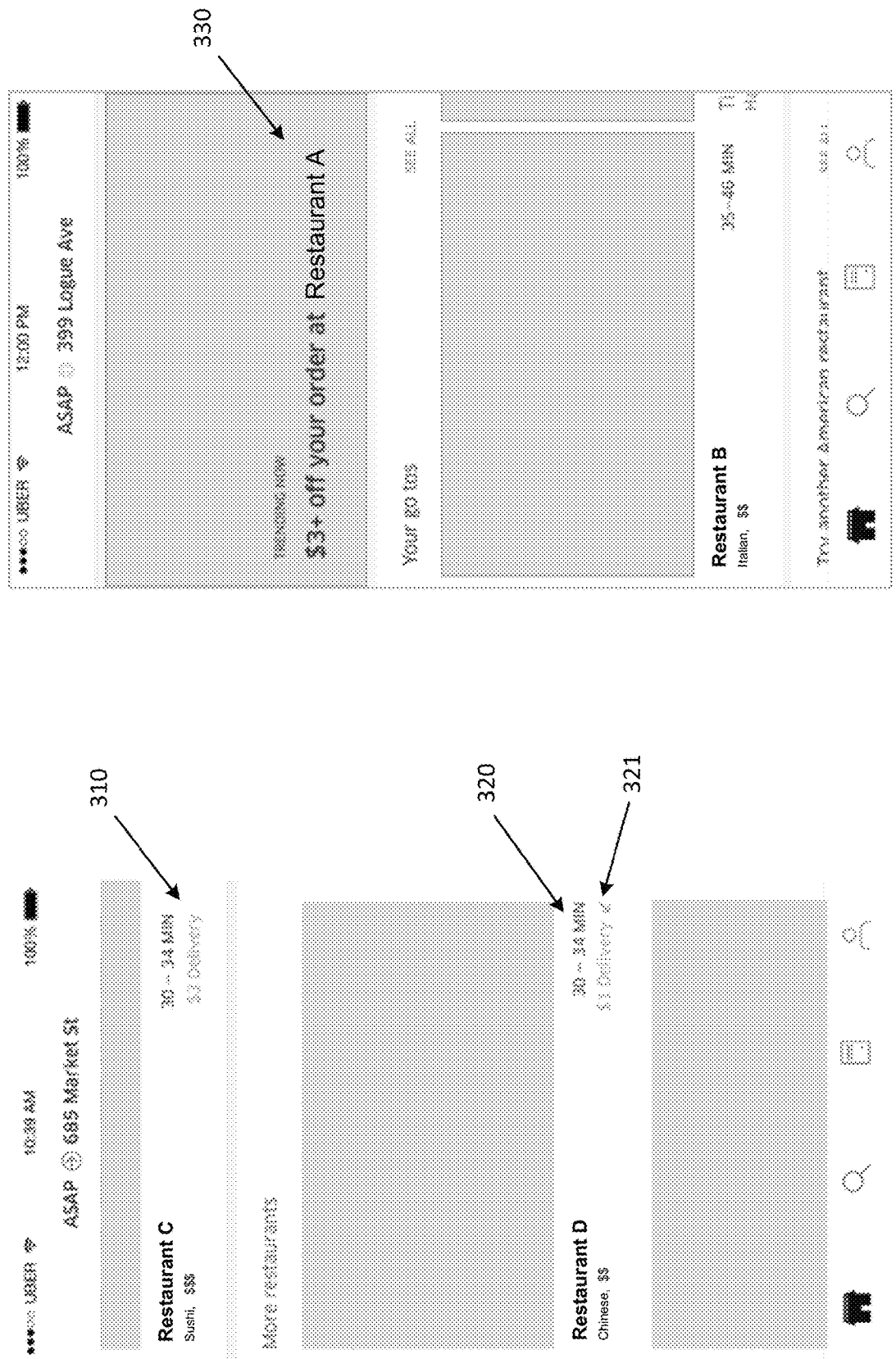

NETWORK SYSTEM CAPABLE OF GROUPING MULTIPLE SERVICE REQUESTS

BACKGROUND

A conventional network service may allow a requesting user to request service associated with a selection of one or more items from an entity to be fulfilled by a service provider. However, each service provider typically can only fulfill a single service request at a time. In addition, in such conventional network services, parameters such as delivery fees associated with the network service are typically fixed to a default value.

BRIEF DESCRIPTION OF THE DRAWINGS

The disclosure herein is illustrated by way of example, and not by way of limitation, in the figures of the accompanying drawings in which like reference numerals refer to similar elements, and in which:

FIGS. 3A-3D are figures illustrating exemplary user interfaces for a user application for a network service, as described herein;

DETAILED DESCRIPTION

Figure 1:
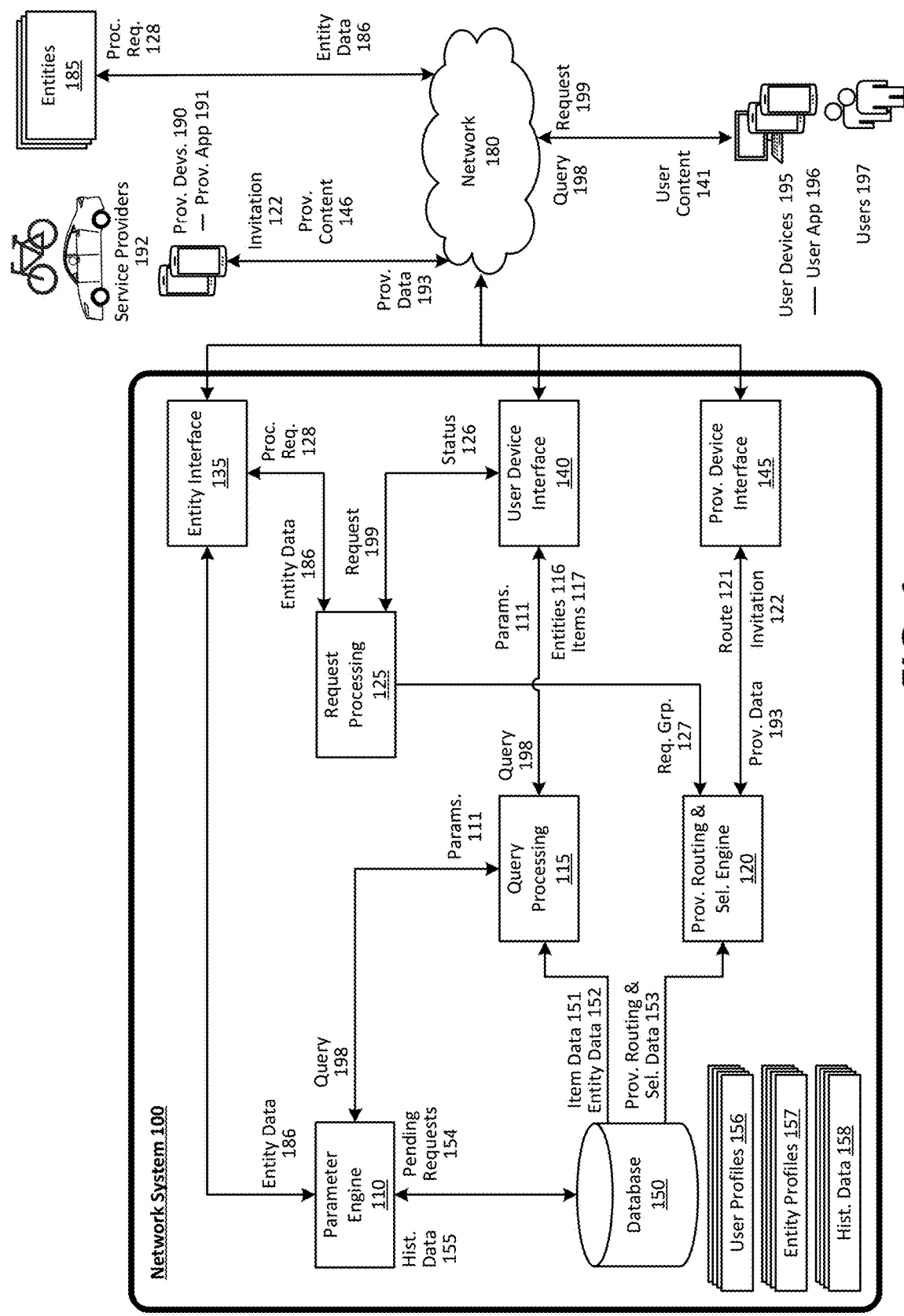
FIG. 1 is a block diagram illustrating an example network system in communication with user devices, service provider devices, and entities, as described herein.

A network service, which is implemented by a computer system(s) (referred to herein as a "network system" for purposes of simplicity), is provided herein that links service providers (e.g., drivers, couriers, autonomous vehicles (AVs), etc.) with requesting users throughout a given geographic region (e.g., a metroplex such as the San Francisco Bay Area). In doing so, the network service communicates with a pool of service providers over the given geographic region, each operating one or more computing devices ("service provider devices" or "provider devices"). The network system receives requests for services (e.g., a delivery service, a courier service, etc.) from requesting users via a designated user or client application ("user application") executing on the users' mobile computing devices ("user devices").

Furthermore, the network system enables users to select, via the user application, items provided by entities. As referred to herein, an entity can correspond to an individual, a company, a group, a vendor or merchant, etc., that provides one or more goods or items for sale (e.g., a chef, a baker, a restaurant, a café, a store, etc.). A service request received by the network system can include a requesting user's selection of items provided by an entity to be transported by the service provider to a service location for delivery to the requesting user. In the context of a delivery service (e.g., food ordering and delivery service), the service location can be a delivery location at which the service provider is to deliver the requested items to the requesting user. In response to the service request, the network system can notify the entity of the user's selection. In addition, the network system can identify an available service provider to fulfill the user's request. The network system can transmit an invitation to a provider device of the identified service provider, who can accept the invitation to fulfill the requested service.

In various aspects, before a user is enabled to make a selection on the user application to submit a service request, the user's user device can transmit a query to the network system. The query can be transmitted in response to the user launching or activating the user application. The query can also be submitted in response to the user's selection of a user interface feature (e.g., a soft selection feature for "Search" or "Submit"). In addition, the query can be automatically or periodically transmitted by the user application or a component of an operating system of the user device. In various aspects, a query can include a desired service location determined using location data generated by the user device or inputted by the requesting user via the user application. The service location can be a location to which the service provider is to deliver items to the requesting user. The query can also include a desired service time (e.g., a time for which the requested service is to be completed or fulfilled by the service provider). In response to receiving the query, the network system can identify entities (e.g., nearby entities, entities located within a specified or predetermined distance from the service location, entities located in a particular geographic region, etc.) that offer items available for selection by the user. In some examples, the network system can also determine available items offered by the identified entities that satisfy the criteria imposed by user inputs (e.g., user preferences for items, service time, etc.). The network system can transmit content data to the user device to enable or cause the user device to display, within the user application, the identified entities and/or the available items. Based on a user selection within the user application, the user device can transmit, to the network system, a service request. The service request can include data indicating the user's selection of one or more of the available items. In response to receiving the service request, the network system can notify the relevant entity(ies) of the user's selection and invite a service provider(s) to fulfill the user's service request (e.g., by delivering the user's selected items from the relevant entity(s) to the user at the desired service location). The network system can also determine a route for the service provider(s). The route can include route segments to the relevant entity(ies) and to the service location.

Embodiments described herein allow for the network system to manage service providers, service requests, and the network service such that a single service provider can service multiple service requests submitted by different users. The network system can determine whether to group service requests by their associated entities. For instance, the network system can determine that two or more service requests for items from the same entity or from entities located within a certain distance can be serviced by a single service provider. Similarly, the network system can determine to group service requests by their service locations.

As described herein, a parameter (e.g., booking fee, service charge, delivery fee, etc.) can be associated with a service request. The parameter can have a predetermined or default value (e.g., flat-rate delivery or service fee) or can be dynamically determined based on factors such as travel distance for the service provider, time of service, etc. Embodiments described herein allow for the network system to dynamically compute one or more parameter values in response to a query from a user based on pending service requests from other users and/or based on anticipated demand for the network service. If the user makes a selection within the user application to submit a service request following the query, one of the one or more dynamically computed parameter values can be associated with the service request.

According to embodiments, each of the one or more parameter values can be determined specifically for a corresponding entity. For example, a user device can transmit, to the network system, query data corresponding to a query for service. The query data can indicate a service location associated with the query for service. In response, the network system can dynamically determine a plurality of parameters, each of the parameters being associated with an entity. In some situations, only a subset of the plurality of parameters are dynamically determined; one or more of the plurality of parameters corresponding to a subset of the entities can have a predetermined or default value.

In some implementations, the network system can dynamically determine values for parameters based on pending service requests received from other users. As used herein, a pending service request can refer to a service request received by the network system for which the requested services are pending to be fulfilled. For example, in response to a query from a user, the network system can determine that there is at least one pending service request from another user for items from a particular entity to the service location associated with the query. Based on this determination, the network system can dynamically determine the parameter associated with the particular entity in response to the query. The dynamically determined value for the parameter can be lower than the predetermined or default value because the network system can leverage existing resources (e.g., a service provider fulfilling the at least one pending service request) to service a request from the user for items from the particular entity. In addition or as an alternative, the network system can dynamically determine parameter values based on anticipated demand. The network system can dynamically determine parameter values based on historical data associated with the network service. Based on the historical data, the network system can determine a metric representative of anticipated demand associated with the particular entity, the service location, and the service time. The metric can also be determined based on third party data, including data regarding weather, scheduled events (e.g., a sporting event), that may affect demand associated with the network service.

In various aspects, the network system can further determine, for each dynamically determined parameter, a corresponding time interval. The time interval can be a window of time for which the dynamically determined parameter is to be valid. For a parameter determined based on pending service requests, the associated time interval can be based on expected time of fulfillment for the pending service requests. For a parameter determined based on anticipated demand for the network service, the associated time interval can be based on historical data associated with the network service indicating times of peak or elevated demand for the network service. Upon the expiration of an associated time interval, the parameter can be recomputed or can be assigned the default parameter value.

In some examples, the network system can cause the user application to display a notification of a dynamically-computed parameter to the user without the need for user action or input. As one example, the user application can periodically transmit a query to the network system while it is being executed in the background on the user device. The user application can also automatically transmit a query to the network device in response to detecting that location data generated by the user device indicates that the user has changed his or her location. The query can alternatively be transmitted by the operating system of the user device or a component thereof. In response to receiving the query, the network system can dynamically determine one or more parameters (e.g., based on pending service requests or based on anticipated demand) associated with entities for service to a location indicated in the query (e.g., using location data generated by the user device). The network system can cause the user device to display the one or more parameters via, for example, a push notification. For example, the user device can receive a push notification to inform the user that a dynamically determined parameter associated with a particular entity for service to a service location near the user's current location is below a default or threshold value (e.g., a dynamically determined booking fee is below a default, flat price). As another example, the network system can dynamically determine one or more parameters for notification to the user without receiving a query from the user device. Rather, the network system can determine one or more parameters for a service location saved in the user's profile (e.g., a favorite location, home address, work address). The network system can thus transmit push notifications to the user device to notify the user of one or more reduced parameters for locations relevant to the user. The notifications can be further customized such that time intervals can be associated with the service locations saved in the user's profile. For instance, the network system can cause notifications regarding reduced parameters to be displayed on the user device for the user's work address between the specific hours of 12:00 PM to 1:00 PM Mondays through Fridays. In this manner, the user can receive useful and relevant notifications without the need for the user device to repeatedly or constantly transmit queries to the network system to indicate a current location of the user. In each of these examples, the user can further opt to receive notifications for only the entities in which the user is interested (e.g., favorite or preferred vendors).

In various aspects, the network system can generate content data in response to queries and transmit content data to the user devices. The content data can cause the user devices to display a variety of information the user may need to make one or more selections as to entities and items for service. For instance, the user devices can utilize the received content data to display menu items for selection by the user. In addition, information such as reviews of specific entities or available items by other users of the network service can be displayed. The content data can further cause the user devices to display the parameters associated with each of the entities. In addition, the content data can cause the user devices to display text or graphics to indicate that a parameter associated with a particular entity is dynamically computed or different compared to the default value. For instance, the user device can display a downward arrow next to the parameter to indicate that the parameter is lower than the default value. The content data can also cause the user device to display a time interval associated with a dynamically determined parameter.

In some examples, the content data can include data to display recommendations regarding particular entities based on parameters associated with the particular entities. For instance, in response to dynamically determining a parameter that is lower than the default value, the network system can generate content data that includes data corresponding to a recommendation to the user regarding the particular entity. The recommendation can be displayed on a home screen of the user application notifying the user that the parameter associated with the particular entity is lower than the default value for an interval of time. The displayed recommendation can also include recommendations regarding particular items in which that the user may be interested (e.g., based on the user's past service requests, based on user profile information, based on user preferences, etc.). The recommendation can be a promotion that indicates that a dynamically determined parameter is valid for a certain amount of time. The user device can further render user interface features for the user to claim the promotion and to submit a service request based on the promotion.

According to embodiments, the network system can select a service provider from a pool of service providers in the geographic region to fulfill multiple service requests from requesting users. The network system can communicate with provider devices operated by service providers to receive data including data regarding location (e.g., geo-location data generated by the provider device) and status (e.g., indicating whether a service provider is available to fulfill a service request). The network system can select the service provider based on location and status. For example, the network system can select a service provider that is located proximately (e.g., within a mile) to the entities and/or to the service location associated with the service requests. The network system can also select a service provider based on a provider type associated with the service provider (e.g., automobile, motorcycle, bicycle, on-foot, etc.). For instance, the network system can select a service provider based on the service provider's provider type that is determined to particularly suit the service location, entity locations, and/or a route (or a portion thereof) determined by the network system (e.g., route to the entity locations and to the service location). For instance, if the service location, entity locations, and/or the route are located in a particularly dense urban environment, the network system can determine to select a service provider having a bicycle provider type. On the other hand, if the route includes a segment over a highway or an expressway, the network system can select a service provider having an automobile provider type. The network system can transmit, to the selected service provider, an invitation to fulfill the requested service. In addition, the network system can select a service provider based on service capacity. For instance, in a delivery service context, the service capacity can be a cargo capacity for items selected by requesting users. As an example, the network system can determine a service capacity requirement based on the particular items selected in service requests that are grouped to be serviced by a single service provider. The network system can maintain or access records corresponding to a service capacity requirements for all items provided by entities. Based on the determined service capacity requirement for the grouped service requests, the network system can select an appropriate service provider from the pool of service providers. For instance, for a group of service requests having a large number of selected items, the network system can select and transmit an invitation to a service provider operating a large capacity vehicle.

According to embodiments, in response to receiving a service request, the network system can process the request data, identify items selected by the requesting user, and transmit data regarding the selected items to corresponding entity(ies). Such information can allow the entities to begin preparing the one or more selected items. In addition, the network system can transmit additional information to the entity(ies) regarding the selected items while the service request is pending (e.g., in queue to be prepared by the entity(ies)). For example, the network system can inform the entity(ies) to delay or expedite the preparation of the items such that the service request can be serviced by a particular service provider (e.g., a service provider servicing another service request). In addition, the network system can, based on historical data relating to demand of specific items at particular times, transmit data to the entities to allow them to prepare items of high demand. In this manner, the entities can be proactively informed to prepare high-demand items for service before service requests for those items are received by the network system. As another example, the network system can determine, based on historical data, that there is a high likelihood that the high-demand items will be requested by one or more users for service at a particular location. In response to this determination, the entities can proactively prepare these items and the network system can notify the service provider fulfilling a pending service request to pick up these high-demand items for delivery to the service location in anticipation of expected service requests for these items.

In certain implementations, the network system can determine a route for a service provider to take in fulfilling service requests received by the network system. The route can include route segment(s) to the entity(ies) associated with the service requests and route segment(s) to the service location(s) associated with the service requests. If the route includes route segments to multiple entities or multiple service locations, the network system can determine an optimal sequence of entities and/or service locations. The optimal sequence can be determined based on estimated preparation times of items associated with the service requests, service request status data received from the entities, traffic conditions, and the like. For instance, a first entity can be sequenced before a second entity based on the network system's determination that item(s) being prepared by the first entity will be completed before item(s) being prepared by the second entity. In addition, the route for the service provider can including timing information (e.g., time to depart) such that the service provider arrives at an entity at or around the time when the entity is estimated to have finished preparing item(s). The network system can also optimize the route based on travel time and/or travel distance. In this manner, the network system can minimize wait times by the service provider (e.g., waiting for items to be prepared at the respective entities' locations) and by the requesting user. In various aspects, the network system can also determine the optimal route based on traffic information (e.g., historical traffic patterns, real-time traffic data, predicted traffic patterns, etc.).

Among other benefits, the examples described herein achieve a technical effect of improving the network system's management of resources. In one aspect, by leveraging pending service requests in fulfilling service requests, the network system can reduce bottlenecks in providing services and improve throughput. In particular, by grouping multiple service requests such that they can be fulfilled by a single service provider, embodiments described herein improve the network system by improving the service capacity of the network service, particularly during peak-demand hours. In addition, by dynamically determining parameters such as delivery or service fees based on pending service requests or anticipated demand, embodiments described herein allow for more efficient management of service providers by encouraging requesting users to submit service requests to "bandwagon" with other pending or anticipated service requests. In this manner, a single service provider can fulfill a plurality of service requests, thereby increasing the efficiency of the network system.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Some examples are referenced herein in context of an autonomous vehicle (AV) or self-driving vehicle (SDV). An AV or SDV refers to any vehicle which is operated in a state of automation with respect to steering and propulsion. Different levels of autonomy may exist with respect to AVs. For example, some vehicles may enable automation in limited scenarios, such as on highways, provided that drivers are present in the vehicle. More advanced AVs can drive without any human assistance from within or external to the vehicle. Such vehicles are often required to make advanced determinations regarding how the vehicle behaves given challenging surroundings of the vehicle environment.

System Descriptions

FIG. 1 is a block diagram illustrating an example network system in communication with user devices, service provider devices, and entities. Network system 100 can manage a network service within a given geographic region (e.g., (e.g., a metroplex such as the San Francisco Bay Area). The network system 100 communicates with provider devices 190 operated by service providers 192 and with user devices 195 operated by users 197. Using the network service provided by the network system 100, users 197 can view and select among available items offered by entities 185. Furthermore, users 197 can request a service related to the user's selection. The network system 100 can identify one or more service providers 192 and transmit invitations to the provider devices 190 to invite the service providers 192 to provide the requested service to a service location. In addition, the network system 100 communicates with entities 185 to transmit data related to the user's 197 request to the entities 185 and receive data regarding status information. As used herein, the user device 195 and the provider device 190 can comprise mobile computing devices (e.g., smartphones, tablet computers, smart watches, etc.), VR or AR headsets, desktop computers, on-board computing systems of vehicles, and the like. In addition, the service provider 192 and provider device 190 can be on-board computing systems of autonomous vehicles.

According to embodiments, the network system 100 can include a user device interface 140 to communicate with user devices 195 over one or more networks 180 via a user application 196. According to examples, a requesting user 197 wishing to utilize the network service can launch or interact with user application 196 on the requesting user's user device 195. The user application 196 can submit a query 198 to the network system 100 over network 180. The query 198 can include data regarding a service location. The user application 196 can determine the service location based on location data generated by the user device 195 (e.g., GPS data) that indicates the user's current location. The user device 195 can transmit query 198 automatically in response to the user's launching or activating of the user application 196 on the user device 195. In some examples, the user application 196 can store a default service location such that the query 198 transmitted in response to the user's launching or activating the user application 196 includes data regarding the default service location. The default service location can be the user's 197 home location, work location, or last-used service location. The query 198 can also be submitted in response to a user selection of or interaction with a user interface feature within the user application 196. The user 197 can also provide a service location by entering an address, searching for a nearby point of interest, or selecting a location on an interactive map within the user application 196. In some examples, the query 198 can be transmitted without user activation of or user interaction with the user application 196. For instance, the user application 196 can transmit the query periodically or automatically in response to detecting a change in the user's location while the user application 196 is being executed in the background on the user device 195. In addition, the query 198 can be transmitted by an operating system of the user device 195 or a component thereof. In some cases, the query 198 can also represent data corresponding to a desired service time.

According to embodiments, query processing 115 receives the query 198 and, in response, determines available entities 116 and items 117. The available entities 116 can be identified from the plurality of entities 185 based on their geographic location as compared with the service location indicated in the query 198. For example, the query processing 115 can identify entities 116 located within a certain distance of the service location, within a certain estimated time of travel from the service location, etc. In addition, the query processing 115 can identify available entities 116 based on their hours of operation as compared with a time of receipt of the query 198 or a service time indicated in the query 198. The available items 117 can correspond to items provided or offered by the entities 116 that can be selected by the user 197 in association with a service request.

According to embodiments, the user device interface 140 transmits data regarding the available entities 116 and items 117 to the requesting user device 195. The data can be transmitted as content data 141 for display on the user device 195 within the user application 196. For instance, the user device interface 140 can include a user content engine to generate the content data 141. The content data can cause the user application 196 to display the available entities 116 and items 117 for viewing and selection by the requesting user 197. In various aspects, content data 141 corresponding to the available items 116 includes information regarding the entities 116 and items 117 including, for example, reviews regarding the entities 116 and items 117, prices associated with the items 117, estimated preparation times associated with the items 117, and the like. In this manner, the requesting user 197 can view value information associated with each of the available items 117 in making his or her selection among the available items 117.

In various aspects, the network system 100 further includes a parameter engine 110 to determine a set of parameters 111 in response to the query 198. The set of parameters 111 can indicate booking fees, delivery fees, or service fees to be charged to the requesting user 197 in association with requesting for the network service. Each of the set of parameters 111 can be associated with an available entity 116 identified by query processing 115. In other words, each available entity 116 can be associated with a different parameter. The set of parameters 111 can be determined by the parameter engine 110 based on pending requests 154 or based on historical data 155. In addition, each of the set of parameters 111 can have a default value (e.g., a default flat rate). The user content data 141 generated by the user device interface can further include data to cause the user device 195 to display the set of parameters 111 determined in response to the query 198.

According to embodiments, the request processing 125 receives, from the requesting user device 195 via the user device interface 140, request 199 corresponding to a request for service. The request 199 can include data indicating the requesting user's selection of item(s) from the available items 117. In response to receiving the request 199, the request processing 125 can generate processed requests 128 to the entity(ies) relevant to the request 199 to inform the entity(ies) of the requesting user's selection and to enable the entity(ies) to being preparing the selected item(s). The processed request 128 can include timing information to indicate to the entity(ies) when to begin preparing the selected items. For instance, the timing information can indicate to the entity(ies) to begin preparing the selected items immediately or in fifteen minutes. In addition, the request processing 125 can determine to group two or more service requests 199 such that a single service provider can fulfill the group of service requests 199. For instance, the request processing 125 can determine, based on a corresponding query 198 in response to which parameter 111 was dynamically determined, that a received service request 199 is to be grouped with another pending service request.

According to embodiments, the network system 100 can include a provider routing and selection engine 120 for identifying a service provider from a plurality of service providers 192 to service the request 199. The service provider can be identified based on its current location relative to the entity(ies) selected in the request 199. For instance, the network system 100 can maintain communications with each of the service provider devices 190 to monitor the current locations of the service providers 192. In response to the request 199, the request processing 125 can identify a service provider based on its current location being within a particular distance or travel time from the entity(ies) associated with the request 199. In some cases, the request processing 125 can identify a service provider based on its provider class. For instance, if the entity(ies) and/or the service location are located in a dense urban region, the provider routing and selection engine 120 can identify a service provider having a provider class corresponding to service providers operating motorcycles or bicycles rather than automobiles. In addition, the identification of service providers can be based on request group 127 received from request processing 125. The request group 127 can indicate a group of service requests to be serviced by a single service provider. The provider selection and routing engine 120 can utilize this information to identify service providers to fulfill service requests 199.

Upon identifying a service provider to fulfill the request 199, the provider routing and selection engine 120 can generate an invitation 122. The invitation can be transmitted by the provider device interface 145 to the provider's provider device 190 via the network(s) 180. In response, the identified service provider can accept or decline the invitation 122. If the service provider accepts the invitation 122 (e.g., via a selection within the provider application 191), the network system 100 can transmit to the provider device 190, for example, a route 121 determined by the provider routing and selection engine 120 to facilitate the fulfillment of the request 199 by the provider device. If the service provider declines the invitation 122, the provider routing and selection engine 120 can identify another suitable service provider.

In the examples described herein, the provider routing and selection engine 120 can also determine a route 121. The route 121 can be transmitted to the selected service provider to follow in fulfilling the requested service. The route 121 can include a route segment(s) to the entity(ies) and a route segment(s) to the service location(s). For example, if the service provider is identified by the network system 100 to fulfill service requests 199 requesting items from more than one entity, the route 121 can include a first route segment from the current location of the selected service provider to a first one of the entities, a second route segment from the first one of the entities to a second one of the entities, etc. Furthermore, if the service provider is identified by the network system 100 to fulfill service requests 199 having different service locations, the route 121 can include a segment from the last one of the entities to the first one of the service locations, a segment from the first one of the service locations to a second one of the service locations, etc.

In some implementations, the provider routing and selection engine 120 can optimize the route 121 based on preparation times associated with the one or more selected items of the request 199. For example, the provider routing and selection engine 120 can optimize the route 121 to minimize wait times for the service provider as well as the requesting user. For example, based on the preparation times, the provider routing and selection engine 120 can determine the optimal route such that the service provider arrives at the location of an entity at or around the time that a selected item being prepared by the entity is estimated to be ready for pick-up. The provider routing and selection engine 120 can further optimize the route 121 by determining an order of entities on the route based on the preparation times of the one or more selected items. The network system can additionally optimize the route to reduce travel distance and/or time. In this manner, wait times for both the service provider 192 and the requesting user 197 can be minimized.

According to embodiments, the provider routing and selection engine 120 can dynamically update the route based on real-time data from the entities 185 regarding status of the one or more selected items (e.g., preparation status, etc.). Accordingly, the route for the selected service provider can be dynamically updated to take into account, for example, any delays at the entities 185 in preparing the one or more selected items. Furthermore, the provider routing and selection engine 120 can further optimize the route to minimize the travel distance and/or travel time. For example, the provider routing and selection engine 120 can take into account traffic information to optimize the route to reduce travel distance and/or travel time. The provider routing and selection engine 120 can also be configured to dynamically balance the various factors and parameters being optimized (e.g., travel distance, travel time, service provider wait time, requesting user wait time, item idle time (e.g., time after item is prepared and before being picked up by the selected service provider), etc.) in determining the optimal route. For instance, during a time period of service provider shortage, the provider routing and selection engine 120 can determine the optimal route such that service provider wait time is weighted more heavily in the optimization process.

According to embodiments, the database 150 of the network system 100 can store information such as user profiles 156, entity profiles 157, and historical data 158. A user profile 156 can store information such as a corresponding user's preferences in items offered by entities (e.g., item preference, favorite entities, favorite item genre, disliked items, food allergies, etc.). The user profile 156 can also store the user's most frequently used or favorite service locations (e.g., work, home, etc.). In addition, the user profile 156 can store information regarding the user's past service requests submitted to the network system 100 (e.g., items requested, amount spent, etc.). Using information stored in the user profiles 156, the network system 100 can optimize the corresponding users' 197 experiences. For instance, the network system 100 can generate item or entity suggestions or recommendations based on information stored in the user profiles 156.

The entity profiles 157 can store information such as an entity's performance record with respect to preparing items in accordance with the items' associated preparation times. For instance, an entity profile 157 may indicate that an entity, based on historical records, has prepared items within their respective preparation times 95% of the time. This information can be transmitted to user device 195 for viewing by a requesting user 197 while the user is viewing available items for selection. In addition, entity profiles 157 can store information such as user reviews and/or ratings of the entities' performance and quality of the items offered by the entities. The database 150 can store historical data 158 in the form of item profiles including information related to each item offered by entities 185 in the given geographic region managed by the network system 100. Such information includes, for example, an associated preparation time, ingredient information, and historical value data, etc.

Methodology

Figure 2:
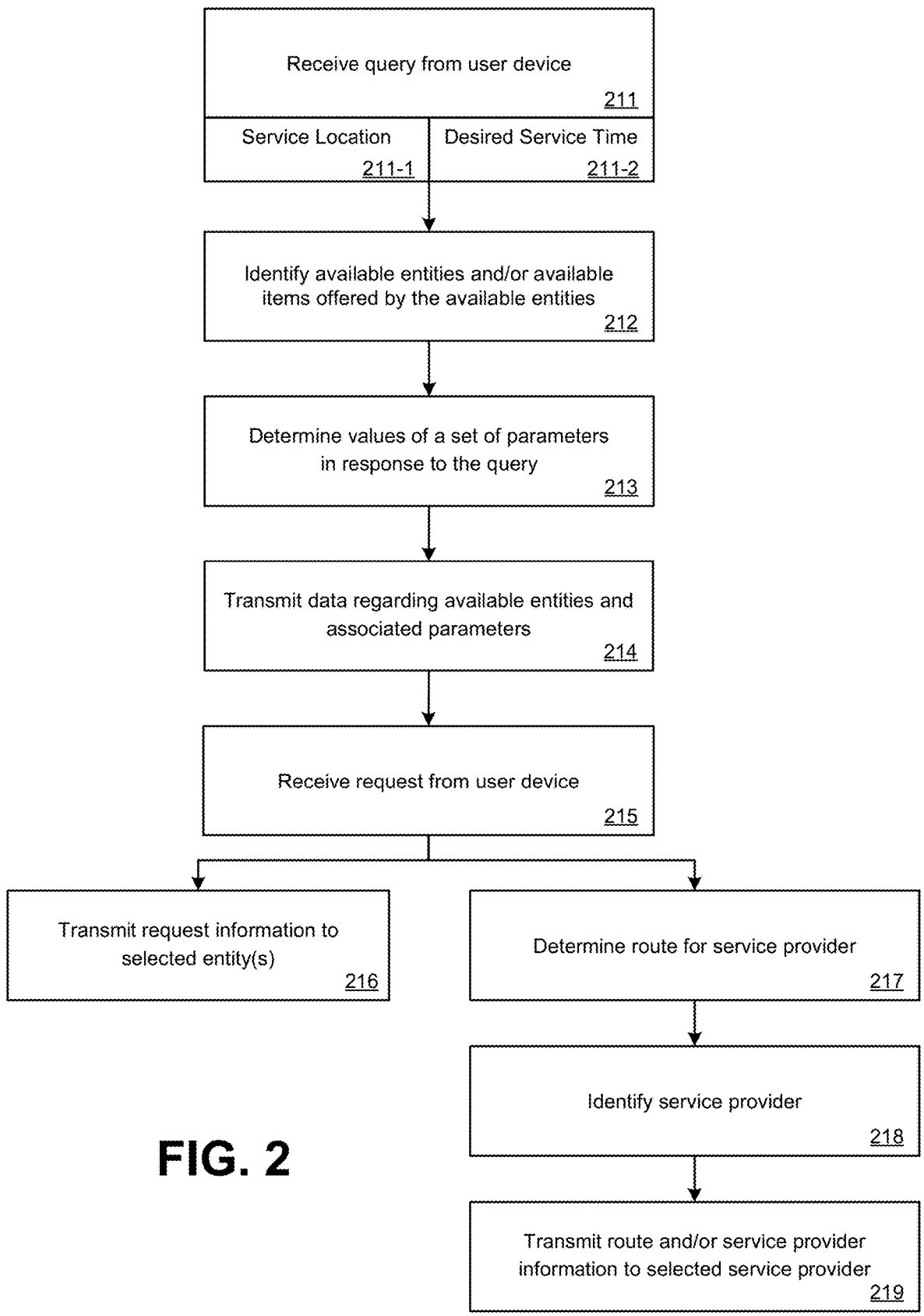
FIG. 2 is a flow chart describing an example method of operating an exemplary network system, according to examples described herein.

FIG. 2 is a flow chart describing an example method of operating an exemplary network system, according to examples described herein. In the below discussion of FIG. 2, reference may be made to features and examples shown and described with respect to FIG. 1. For instance, the process described with respect to FIG. 2 may be performed by an example network system such as the one shown and described with respect to FIG. 1.

Referring to FIG. 2, a network system (e.g., network system 100 of FIG. 1) can receive a query from a user device (e.g., user device 195 of FIG. 1) operated by a user over a network (211). The query can be transmitted by the user device in response to user interactions with a user application executing on the user device (e.g., opening or launching the user application, selecting or activating a user interface feature, etc.). The query received from the user device can include a service location 211-1 and/or a desired service time 211-2. The service location 211-1 can be determined based on geo-location data generated by the user device (e.g., GPS, GLONASS, or Galileo data etc.), entered by the user through the user application (e.g., by entering an address, by searching a name or location, by selecting on an interactive map, etc.), or auto-populated based on historical data pertaining to the user (e.g., a home location, a work location, a favorite location, etc.). The desired service time 211-2 can correspond to a desired time at which the requested service is to be fulfilled (e.g., a time at which the service provider is to rendezvous with the requesting user). By selecting a desired service time 211-2, the requesting user can schedule a service to be performed at a specific time. The network system can make determinations for various aspects of the requested service for the requesting user based on the service location 211-1 and the desired service time 211-2 (e.g., identifying available entities nearby in response to the query).

In the examples described herein, the network system can identify available entities and/or available items offered by the available entities (212). The network system can identify available entities based on the service location 211-1. For instance, the network system can identify entities that are within a certain distance from the service location or within a certain estimated time of travel away from the service location. The network system can also identify entities based on the desired service time 211-2. For example, the network system can exclude entities that are outside their operating hours at or around the desired service time.

According to embodiments, the network system can determine values for a set of parameters in response to the query (213). The values of the set of parameters can be default values or dynamically determined values. Each of the parameters can be associated with an available entity. For instance, in identifying four available entities that are nearby to the service location, the network system can determine four parameters, each parameter being associated with one of the available entities. The network system can determine the values of the set of parameters based on pending service requests or based on anticipated demand. For example, the network system can determine that there is at least pending one service request for items from a particular entity to the service location indicated in the received query. In response, the network system can dynamically compute the value of the parameter associated with the particular entity based on the determination. In addition, the network system can determine a time interval for which the dynamically computed parameter value is to be in effect. For instance, if the pending service request is estimated to be picked up by a service provider from the particular entity within thirty minutes, the time interval can be determined to be a maximum of thirty minutes.

In the examples described herein, the network system can transmit data regarding the available entities and their associated parameters to the requesting user device (214). Data transmitted to the requesting user device can include content data for displaying content regarding the available entities and the parameters on the user devices. For example, data transmitted by the network system can cause or enable the user devices to display a list of available entities and their associated parameter values. The requesting user can view and interact with the lists to select an entity in association with making a service request. In addition, the content data can include data corresponding to a recommendation or a promotion for display on the user device. The display of the recommendation or promotion can include the dynamically computed parameter value and the associated time interval for which the parameter value is to be valid. In addition, the content data can include data to display items for selection at each of the available entities (e.g., menu items). Furthermore, the content data can include relevant information such as user reviews or ratings of available items and/or each of the plurality of entities, images of the available items, etc. Additionally, the content data can include one or more suggested items for the requesting user based on the requesting user's preferences. For example, the content data can include an item complements suggestion indicating a plurality of items that the requesting user may enjoy at the same time (e.g., a suggested item that would complement a selected item).

According to embodiments, the network system can receive a request from the user device (215). The request can include data regarding the user's selection of one or more items for service to the service location 211-1. The request can be generated by the user device in response to the requesting user's interaction with the user application (e.g., using a "Submit" or "Place Order" user interface feature).

In various examples, in response to receiving the request at step 215, the network system transmits request information to the relevant entity(ies) (216). In some examples, the request information includes a desired preparation completion time. The desired preparation completion time can be a time for the entity to complete preparation of a corresponding item that is estimated by the network system to ensure that the request is fulfilled in a timely manner (e.g., at or around the desired service time 211-2). As an alternative, the network system can transmit information to enable the entity(ies) to prepare items based on historical data relating to demand.

According to embodiments, the network system further determines an optimal route for a service provider in fulfilling the request for service (217). This step may be performed, for example, by service provider routing and selection engine 120 of FIG. 1. In particular, the optimal routes can be determined based on preparation times associated with the one or more selected items to, for example, minimize wait times for the selected service provider as well as the requesting user. For example, based on the preparation times, the network system can determine the optimal route such that the selected service provider arrives at the location of an entity at or around the time that a selected item being prepared by the entity is estimated to be ready for pick-up. The network system can further optimize the route by determining a sequence of entities on the route based on the preparation times of the selected items. The network system can additionally optimize the route to reduce travel distance and/or time. In addition, the network system can receive real-time data from entities to update the optimal route. For example, based on real-time data indicating delays at one particular entity, the network system can update the optimal route to account for the delays (e.g., re-order the order of entities or delaying the route segment to the particular entity experiencing the delays). In this manner, the route for the service provider can remain optimal based on up-to-date information.

In various aspects, the network system can identify or select a service provider from a plurality of service providers to fulfill the request for service (218). For instance, the network system can select a service provider located proximately to an entity and/or the service location. Additionally, the network system can select a service provider based on the optimal route. For instance, the network system can select a bicycle service provider based on the optimal route being within a dense urban environment. In contrast, if the optimal route includes one or more segments over a freeway or highway, the network system can select an automobile service provider. In addition, the network system can identify a service provider based on a service capacity associated therewith. For instance, the network system can determine a required service capacity based on items selected by requesting users in a group of service requests to be serviced by a single service provider. The network system can identify a service provider such that the service capacity of the service provider is sufficient in fulfilling the group of service requests.

According to embodiments, the network system can transmit data corresponding to the optimal route to the selected service provider (219). The data corresponding to the optimal route can include content data, such as map data to enable or cause a provider device of the selected provider to display route guidance or an interactive map that includes the optimal route.

User Interface Descriptions

Figures 3C, 3D:
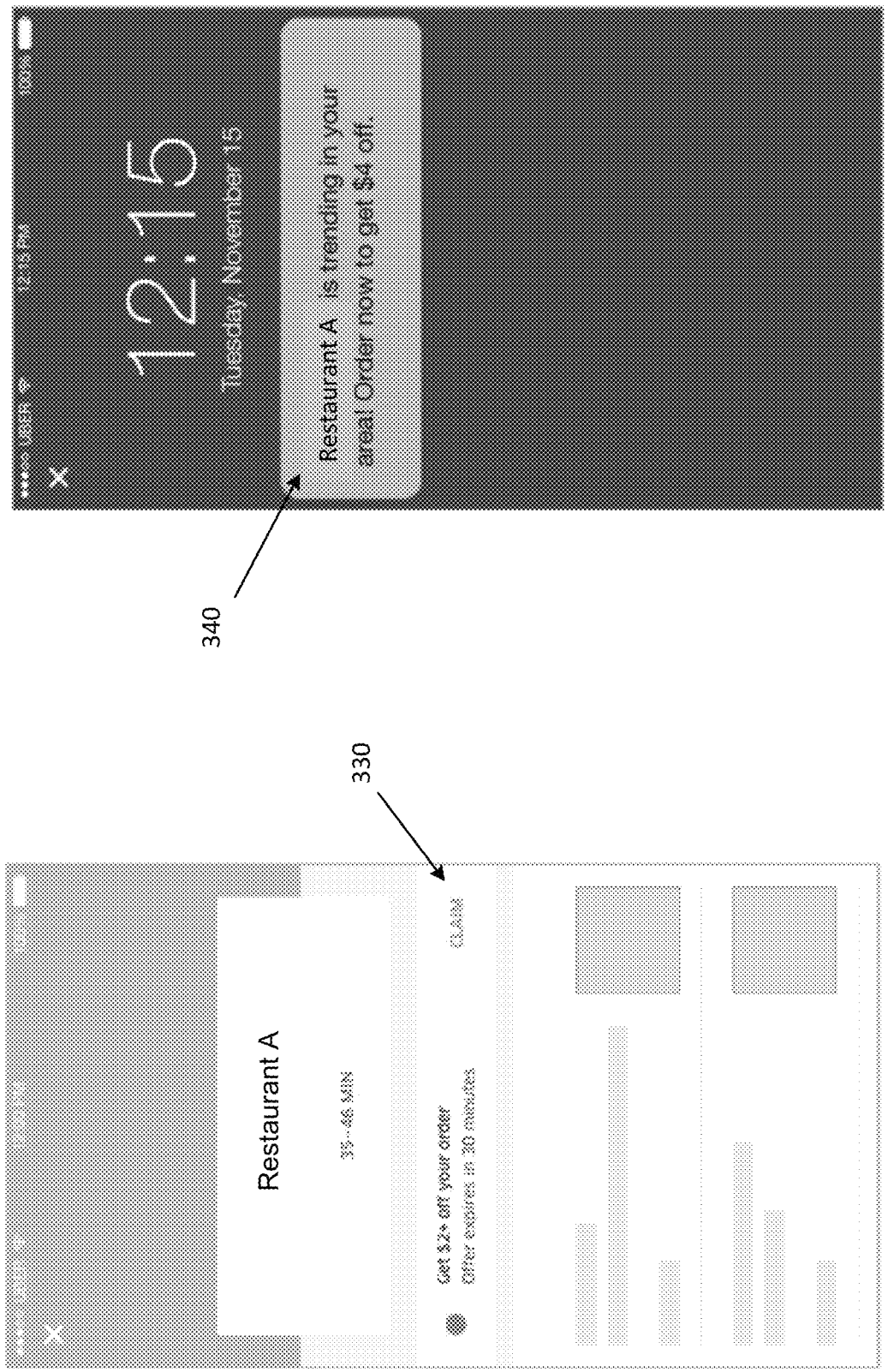

FIGS. 3A-3D are figures illustrating exemplary user interfaces for a user application for a network service, as described herein. Referring to FIG. 3A, a user interface for a user application is illustrated. The user interface illustrated in FIG. 3A can be displayed after a query is transmitted (e.g., when the user app initializes) to a network system managing the network service. The user interface displays information regarding multiple entities (e.g., Restaurant C, Restaurant D). In addition, the user interface displays information regarding the parameters associated with the entities. For the first entity displayed within the user interface (Restaurant C), parameter information 310 is displayed. Parameter information 310 indicates that a default parameter ($3) will be applied to a service request submitted by the user for the first entity via the user application. For the second entity displayed within the user interface (Restaurant D), parameter information 320 is displayed. Parameter information 320 indicates that a dynamically determined parameter ($1) will be applied to a service request submitted by the user for the second entity via the user application. In addition, user application displays an indicator 321, a downward arrow, to indicate that the parameter value is dynamically determined and lower than the default value.

User interface illustrated in FIG. 3B shows a promotion 330 generated in response to a query submitted by the user device. The promotion 330 indicates that the parameter associated with an entity (Restaurant A) is dynamically determined to be lower than the default value ($3 lower). Referring to FIG. 3C, another user interface displaying a promotion 330 is illustrated. This user interface displays information specific to an entity (Restaurant A). The promotion 330 relays to the user that the dynamically determined parameter is lower than the default value. In addition, the parameter 330 further indicates a time interval for which the dynamically determined parameter is to be valid (30 minutes).

Referring to FIG. 3D, a home screen or lock screen of a user device is illustrated. A push notification 340 is displayed on the screen of the user device. The push notification 340 indicates that a particular entity (Restaurant A) currently has a dynamically determined parameter that is lower than the default value. The user can interact with the push notification to open the user application to submit a service request.

Hardware Diagram

Figure 4:
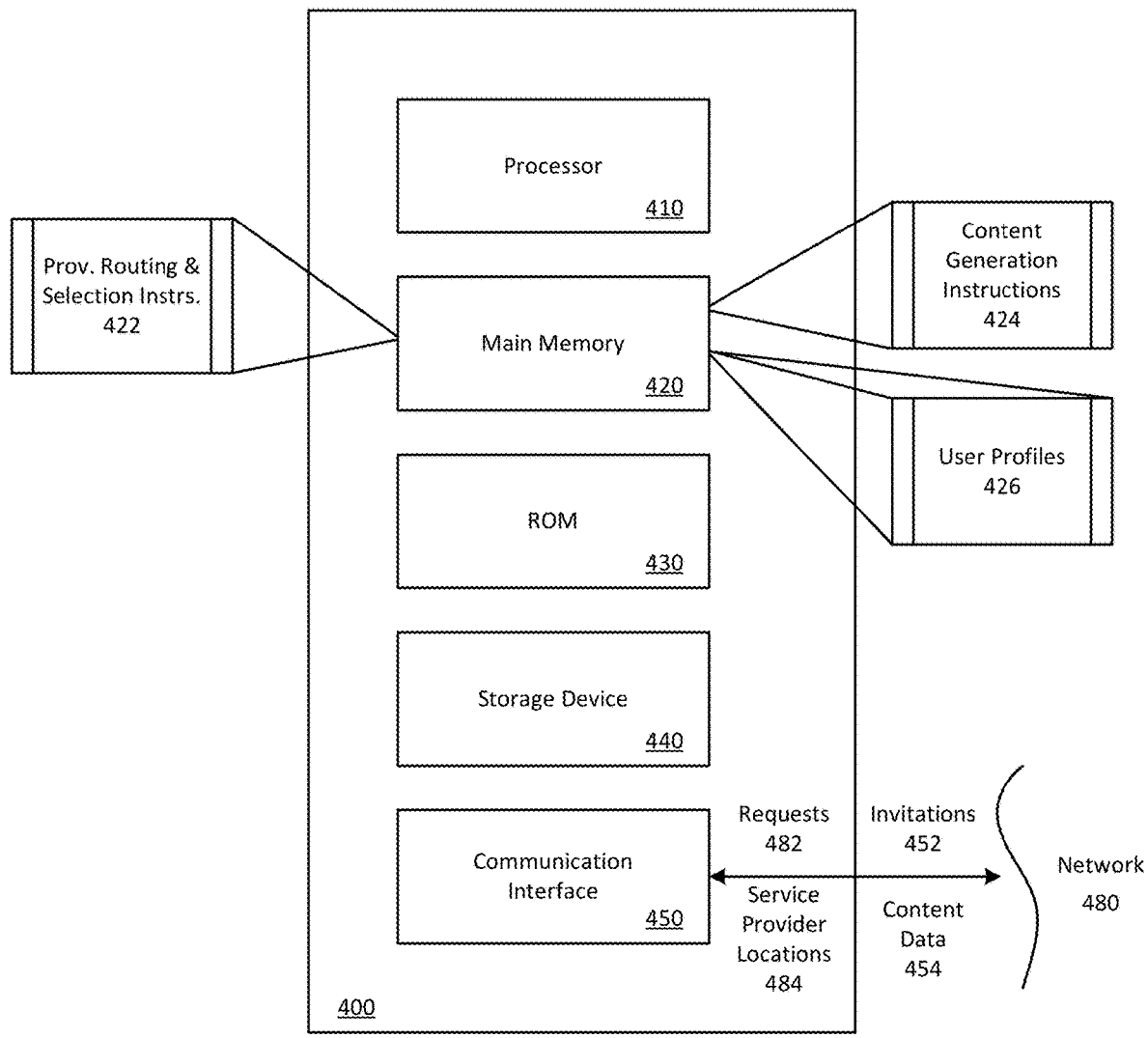
FIG. 4 is a block diagram that illustrates a computer system upon which examples described herein may be implemented.

FIG. 4 is a block diagram that illustrates a computer system upon which examples described herein may be implemented. A computer system 400 can be implemented on, for example, a server or combination of servers. For example, the computer system 400 may be implemented as part of a network service, such as described in FIGS. 1 through 6. In the context of FIG. 1, the network system 100 may be implemented using a computer system 400 such as described by FIG. 4. The network system 100 and may also be implemented using a combination of multiple computer systems as described in connection with FIG. 4.

In one implementation, the computer system 400 includes processing resources 410, a main memory 420, a read-only memory (ROM) 430, a storage device 440, and a communication interface 450. The computer system 400 includes at least one processor 410 for processing information stored in the main memory 420, such as provided by a random access memory (RAM) or other dynamic storage device, for storing information and instructions which are executable by the processor 410. The main memory 420 also may be used for storing temporary variables or other intermediate information during execution of instructions to be executed by the processor 410. The computer system 400 may also include the ROM 430 or other static storage device for storing static information and instructions for the processor 410. A storage device 440, such as a magnetic disk or optical disk, is provided for storing information and instructions.

The communication interface 450 enables the computer system 400 to communicate with one or more networks 480 (e.g., cellular network) through use of the network link (wireless or wired). Using the network link, the computer system 400 can communicate with one or more computing devices, one or more servers, one or more databases, and/or one or more self-driving vehicles. In accordance with examples, the computer system 400 receives requests 482 from mobile computing devices of individual users. The executable instructions stored in the memory 430 can include provider routing and selection instructions 422, which the processor 410 executes to determine an optimal route and select a service provider to service the request 482.

The executable instructions stored in the memory 420 can also include content generation instructions 424, which enable the computer system 400 to access user profiles 426 and other user information in order to select and/or generate user content 454 for display on the user devices. As described throughout, user content 454 can be generated based on information pertaining to the state of the request (e.g., status information). By way of example, the instructions and data stored in the memory 420 can be executed by the processor 410 to implement an example network system 100 of FIG. 1. In performing the operations, the processor 410 can receive requests 482 and service provider locations 484, and submit invitation messages 452 to facilitate the servicing of the requests 482. The processor 410 is configured with software and/or other logic to perform one or more processes, steps and other functions described with implementations, such as described by FIGS. 1 to 4, and elsewhere in the present application.

Examples described herein are related to the use of the computer system 400 for implementing the techniques described herein. According to one example, those techniques are performed by the computer system 400 in response to the processor 410 executing one or more sequences of one or more instructions contained in the main memory 420. Such instructions may be read into the main memory 420 from another machine-readable medium, such as the storage device 440. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

User Device

Figure 5:
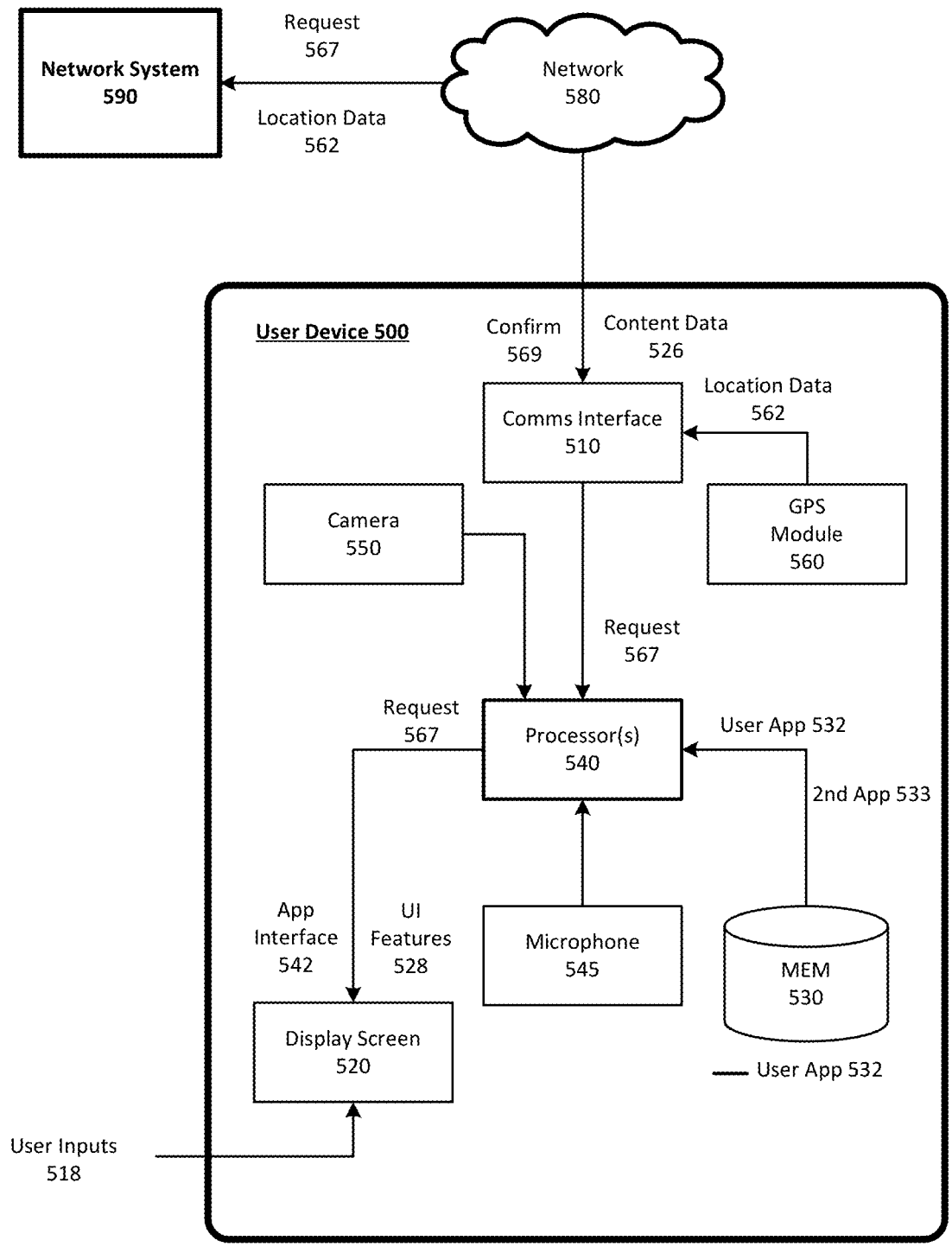
FIG. 5 is a block diagram illustrating an example user device executing and operating a designated user application for communicating with a network service, according to examples described herein.

FIG. 5 is a block diagram illustrating an example user device executing and operating a designated user application for communicating with a network service, according to examples described herein. In many implementations, the user device 500 can comprise a mobile computing device, such as a smartphone, tablet computer, laptop computer, VR or AR headset device, and the like. As such, the user device 500 can include typical telephony features such as a microphone 545, a camera 550, and a communication interface 510 to communicate with external entities using any number of wireless communication protocols. In certain aspects, the user device 500 can store a designated application (e.g., a user app 532) in a local memory 530. In variations, the memory 530 can store additional applications executable by one or more processors 540 of the user device 500, enabling access and interaction with one or more host servers over one or more networks 580.

In response to a user input 518, the user app 532 can be executed by a processor 540, which can cause an app interface 542 to be generated on a display screen 520 of the user device 500. The app interface 542 can enable the user to, for example, view available items offered by nearby entities. In various implementations, the app interface 542 can further enable the user to enter or select a service location (e.g., by entering an address, performing a search, or selecting on an interactive map). Furthermore, the app interface 542 can display dynamically determined values associated with the available items. The user can generate a request 567 via user inputs 518 provided on the app interface 542. For example, the user can select one or more items from the available items in requesting the network service. In some examples, the app interface 542 can display one or more suggested or recommended items that are identified by the network system based on information specific to the user (e.g., user profile information).

As provided herein, the user application 532 can further enable a communication link with a network system 590 over the network 580, such as the network system 100 as shown and described with respect to FIG. 1. The processor 540 can generate user interface features 528 (e.g., map, request status, content cards, etc.) using content data 526 received from the network system 590 over network 580. Furthermore, as discussed herein, the user application 532 can enable the network system 590 to cause the generated user interface 528 to be displayed on the application interface 542.

The processor 540 can transmit the requests 567 via a communications interface 510 to the backend network system 590 over a network 580. In response, the user device 500 can receive a confirmation 569 from the network system 590 indicating the selected service provider that will service the request 567. In various examples, the user device 500 can further include a GPS module 560, which can provide location data 562 indicating the current location of the requesting user to the network system 590 to, for example, establish the service location.

According to embodiments, the app interface 542 can further display user interface features indicating or representing a current status of the request for service. For instance, the app interface 542 can display a progress bar indicating the current status of the user's request. The app interface 542 can also display useful information such as an estimated time of arrival of the selected service provider at the service location. In addition, the user can enter, via the app interface 542, information that may be relevant to the selected service provider such as a building entry access code, an intercom number or code, a contact phone number of the user, a cross-street etc.

Service Provider Device

Figure 6:
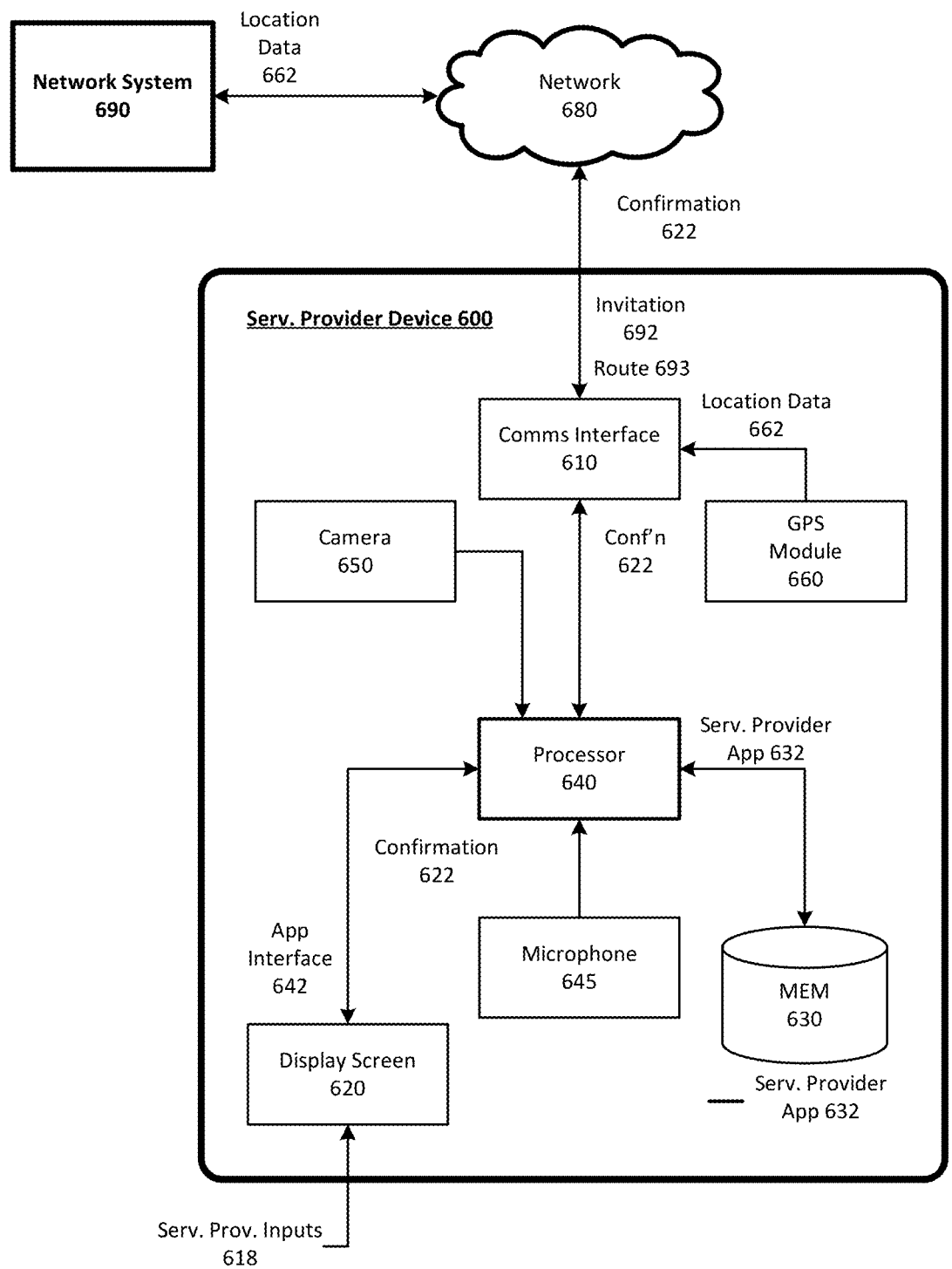
FIG. 6 is a block diagram illustrating an example service provider device executing and operating a designated service provider application for communicating with a network service, according to examples described herein.

FIG. 6 is a block diagram illustrating an example service provider device executing and operating a designated service provider application for communicating with a network service, according to examples described herein. In many implementations, the service provider device 600 can comprise a mobile computing device, such as a smartphone, tablet computer, laptop computer, VR or AR headset device, and the like. As such, the service provider device 600 can include typical telephony features such as a microphone 645, a camera 650, and a communication interface 610 to communicate with external entities using any number of wireless communication protocols. The service provider device 600 can store a designated application (e.g., a service provider app 632) in a local memory 630. In response to a service provider input 618, the service provider app 632 can be executed by a processor 640, which can cause an app interface 642 to be generated on a display screen 620 of the service provider device 600. The app interface 642 can enable the service provider to, for example, accept or reject invitations 692 in order to service requests throughout a given region.

In various examples, the service provider device 600 can include a GPS module 660, which can provide location data 662 indicating the current location of the service provider to the network system 690 over a network 680. Thus, the network system 690 can utilize the current location 662 of the service provider to determine whether the service provider is optimally located to service a particular request. If the service provider is optimal to service the request, the network system 690 can transmit an invitation 692 to the service provider device 600 over the network 680. The invitation 692 can be displayed on the app interface 642, and can be accepted or declined by the service provider. If the service provider accepts the invitation 692, then the service provider can provide a service provider input 618 on the displayed app interface 642 to provide a confirmation 622 to the network system 690 indicating that the service provider will follow a route 693 received from the network system 690 to fulfill the requested service.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A network system, for providing a delivery service over a given geographic region, comprising:
  one or more processors;
  one or more memory resources storing instructions that, when executed by the one or more processors, cause the network system to:
    receive, from a first user device of a first user, a first set of data corresponding to a first service request of the first user for items for delivery from a first entity, the first set of data indicating a first service location associated with the first service request, the first service request being associated with a first service charge;
    receive, from a second user device of a second user, a second set of data indicating a second service location associated with the second user;
    determine whether the second service location is located within a threshold distance of the first service location indicated by the first service request of the first user; and
    in response to determining that the second service location is located within the threshold distance of the first service location indicated by the first service request of the first user:
      dynamically determine a second service charge for a prospective request from the second user for one or more items for delivery from the first entity, the second service charge being (i) based at least on a number of pending service requests associated with the first entity, each of the pending service requests having a respective service location located within the threshold distance of the first service location (ii) lower than the first service charge;

transmit, to the second user device, a push notification indicating that the first entity has a dynamically determined parameter comprising the second service charge that is lower than a default value;

receive data indicative of the second user interacting with the push notification;

transmit, to the second user device, in response to the second user interacting with the push notification, a third set of data to cause the second user device to display a list of available entities including the first entity, wherein the first entity is presented on the second user device as being associated with the second service charge;

receive, from the second user device of the second user, a fourth set of data corresponding to a second service request of the second user for items for delivery from the first entity; and identify a first service provider to fulfill the first service request and the second service request.

2. The network system of claim 1, wherein the executed instructions further cause the network system to:
transmit, to a provider device of the first service provider, a fifth set of data, including data corresponding to a route.

3. The network system of claim 2, wherein the route includes a route segment to the first entity, a route segment to the first service location, and a route segment to the second service location.

4. A computer-implemented method for providing a delivery service over a given geographic region, the method being performed by a network system and comprising:
receiving, from a first user device of a first user, a first set of data corresponding to a first service request of the first user for items for delivery from a first entity, the first set of data indicating a first service location associated with the first service request, the first service request being associated with a first service charge;

receiving, from a second user device of a second user, a second set of data indicating a second service location associated with the second user;

determining whether the second service location is located within a threshold distance of the first service location indicated by the first service request of the first user; and in response to determining that the second service location is located within the threshold distance of the first service location indicated by the first service request of the first user:
dynamically determining a second service charge for a prospective request from the second user for one or more items for delivery from the first entity, the second service charge being (i) based at least on a number of pending service requests associated with the first entity, each of the pending service requests having a respective service location located within the threshold distance of the first service location and (ii) lower than the first service charge;

transmitting, to the second user device, a push notification indicating that the first entity has a dynamically determined parameter comprising the second service charge that is lower than a default value;

receiving data indicative of the second user interacting with the push notification;

transmitting, to the second user device, in response to the second user interacting with the push notification, a third set of data to cause the second user device to display a list of available entities including the first entity, wherein the first entity is presented on the second user device as being associated with the second service charge;

receiving, from the second user device of the second user, a fourth set of data corresponding to a second service request of the second user for items for delivery from the first entity; and identifying a first service provider to fulfill the first service request and the second service request.

5. The network system of claim 1, wherein the first service charge is a default value and the second service charge is an adjustable value that is adjusted with respect to the default value.

6. The network system of claim 1, where the executed instructions further cause the network system to:
in response to determining that the second service charge is below a threshold value, transmit, to a third user device of a third user, a set of notification data to cause the third user device to display a notification regarding the second service charge being associated with the first entity.

7. The network system of claim 6, wherein the set of notification data is transmitted to the third user device without the third user interacting with the third user device to transmit any queries to the network system.

8. The network system of claim 1, wherein the second service charge is computed based further on historical data associated with the delivery service that indicate an anticipated demand for service requests associated with the first entity.

9. The computer-implemented method of claim 4, wherein the first service charge is a default value and the second service charge is an adjustable value that is adjusted with respect to the default value.

10. The computer-implemented method of claim 4, further comprising:
in response to determining that the second service charge is below a threshold value, transmitting, to a third user device of a third user, a set of notification data to cause the third user device to display a notification regarding the second service charge being associated with the first entity.

11. The computer-implemented method of claim 10, wherein the set of notification data is transmitted to the third user device without the third user interacting with the third user device to transmit any queries to the network system.

12. The computer-implemented method of claim 4, wherein the
second service charge is computed based further on historical data associated with the delivery service that indicate an anticipated demand for service requests associated with the first entity.

13. A non-transitory computer-readable medium storing instructions that, when executed by one or more processors of a network system, cause the network system to:
receive, from a first user device of a first user, a first set of data corresponding to a first service request of the first user for items for delivery from a first entity, the first set of data indicating a first service location associated with the first service request, the first service request being associated with a first service charge;
receive, from a second user device of a second user, a second set of data indicating a second service location associated with the second user;
determine whether the second service location is located within a threshold distance of the first service location indicated by the first service request of the first user; and
in response to determining that the second service location is located within the threshold distance of the first service location indicated by the first service request of the first user:
dynamically determine a second service charge for a prospective request from the second user for one or more items for delivery from the first entity, the second service charge being (i) based at least on a number of pending service requests associated with the first entity, each of the pending service requests having a respective service location located within the threshold distance of the first service location and (ii) lower than the first service charge;
transmit, to the second user device, a push notification indicating that the first entity has a dynamically determined parameter comprising the second service charge that is lower than a default value;
receive data indicative of the second user interacting with the push notification;
transmit, to the second user device, in response to the second user interacting with the push notification, a third set of data to cause the second user device to display a list of available entities including the first entity, wherein the first entity is presented on the second user device as being associated with the second service charge;
receive, from the second user device of the second user, a fourth set of data corresponding to a second service request of the second user for items for delivery from the first entity; and
identify a first service provider to fulfill the first service request and the second service request.

14. The network system of claim 1, wherein the executed instructions further cause the network system to:
determine whether a second service time indicated by the second set of data is within a threshold time of a first service time associated with the first service request of the first user to determine whether to associate the prospective request of the second user for items for delivery from the first entity with second service charge.

15. The network system of claim 14, wherein the network system transmits the third set of data to cause the second user device to display the first entity as being associated with the second service charge in response to determining that the second service time is within the threshold time of the first service time associated with the first service request of the first user.

16. The computer-implemented method of claim 4, further comprising:
determining whether a second service time indicated by the second set of data is within a threshold time of a first service time associated with the first service request of the first user to determine whether to associate the prospective request of the second user for items for delivery from the first entity with second service charge.

17. The computer-implemented method of claim 16, wherein network system transmits the third set of data to cause the second user device to display the first entity as being associated with the second service charge in response to determining that the second service time is within the threshold time of the first service time associated with the first service request of the first user.

18. The non-transitory computer-readable medium of claim 13, wherein the executed instructions further cause the network system to:
determine whether a second service time indicated by the second set of data is within a threshold time of a first service time associated with the first service request of the first user to determine whether to associate the prospective request of the second user for items for delivery from the first entity with second service charge.

* * * * *